United States Patent
Park et al.

(10) Patent No.: US 11,312,240 B2
(45) Date of Patent: Apr. 26, 2022

(54) HYBRID ELECTRIC VEHICLE AND BRAKING CONTROL METHOD THEREOF

(71) Applicants: Hyundai Motor Company, Seoul (KR); Kia Motors Corporation, Seoul (KR)

(72) Inventors: Joon Young Park, Seoul (KR); Sung Deok Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 154 days.

(21) Appl. No.: 16/696,240

(22) Filed: Nov. 26, 2019

(65) Prior Publication Data

US 2020/0307385 A1    Oct. 1, 2020

(30) Foreign Application Priority Data

Mar. 27, 2019 (KR) .......................... 10-2019-0034836

(51) Int. Cl.
*B60L 7/26* (2006.01)
*B60L 15/20* (2006.01)
*B60W 30/18* (2012.01)

(52) U.S. Cl.
CPC ............. *B60L 7/26* (2013.01); *B60L 15/2009* (2013.01); *B60W 30/18127* (2013.01)

(58) Field of Classification Search
CPC .......... B60L 7/18; B60L 7/26; B60L 15/2009; B60L 2240/36; B60L 2240/425;
(Continued)

(56) References Cited

U.S. PATENT DOCUMENTS 5,967,621 A * 10/1999 Ito ............................ B60L 7/12
                                                        303/15
10,759,411 B2 * 9/2020 Cho ..................... B60W 10/184
(Continued)

FOREIGN PATENT DOCUMENTS

JP    2000032602 A * 1/2000
JP    2002095102 A * 3/2002 .............. B60L 15/20
(Continued)

OTHER PUBLICATIONS

Wikipedia article, "Motor controller", Old revision dated Oct. 26, 2018, 6 pages (Year: 2018).*

*Primary Examiner* — David A Testardi
(74) *Attorney, Agent, or Firm* — Mintz Levin Cohn Ferris Glovsky and Popeo, P.C.; Peter F. Corless

(57) ABSTRACT

A hybrid electric vehicle and a braking control method thereof are provided. The method includes determining, by a first controller, a total braking amount corresponding to a brake pedal manipulation amount and transmitting a regenerative braking request corresponding to at least a portion of the total braking amount to a second controller. A state of a regenerative braking system having a motor and a battery is determined and a regenerative braking execution amount is calculated by selectively using a first torque corresponding to a torque command transmitted to a third controller to operate the motor based on the regenerative braking request or a second torque measured by the third controller based on the determined state. A braking force of a frictional brake is determined based on the calculated regenerative braking execution amount and the total braking amount.

16 Claims, 5 Drawing Sheets

(58) Field of Classification Search
CPC ........... B60W 20/14; B60W 30/18127; B60W 2510/087; B60T 1/10; B60T 13/586; B60T 2270/604
See application file for complete search history.

(56) References Cited

U.S. PATENT DOCUMENTS

| | | | | |
|---|---|---|---|---|
| 2002/0030408 A1* | 3/2002 | Niwa | ............... | B60T 8/267 303/152 |
| 2002/0180266 A1* | 12/2002 | Hara | ............... | B60L 7/12 303/152 |
| 2003/0184155 A1* | 10/2003 | Crombez | ............... | B60L 50/52 303/152 |
| 2004/0207350 A1* | 10/2004 | Wilton | ............... | B60L 3/0061 318/376 |
| 2007/0126382 A1* | 6/2007 | Kang | ............... | B60W 10/08 318/376 |
| 2008/0116744 A1* | 5/2008 | Kim | ............... | B60L 7/26 303/152 |
| 2009/0118885 A1* | 5/2009 | Heap | ............... | B60K 6/365 701/22 |
| 2011/0276243 A1* | 11/2011 | Minarcin | ............... | B60L 7/14 701/70 |
| 2012/0056470 A1* | 3/2012 | Kim | ............... | B60T 13/586 303/3 |
| 2012/0136547 A1* | 5/2012 | Miyazaki | ............... | B60T 8/4081 701/70 |
| 2012/0330484 A1* | 12/2012 | Martin | ............... | B60L 7/18 701/22 |
| 2013/0345918 A1* | 12/2013 | Ozaki | ............... | B60W 10/196 701/22 |
| 2015/0057857 A1* | 2/2015 | Katsuta | ............... | B60L 50/15 701/22 |
| 2015/0175010 A1* | 6/2015 | Tang | ............... | H02P 29/032 701/22 |
| 2016/0039292 A1* | 2/2016 | Takahashi | ............... | B60W 30/18109 701/70 |
| 2016/0068081 A1* | 3/2016 | Li | ............... | B60L 15/025 701/22 |
| 2016/0121727 A1* | 5/2016 | Kim | ............... | B60L 7/26 701/70 |
| 2016/0121728 A1* | 5/2016 | Huh | ............... | B60L 7/18 701/70 |
| 2016/0129791 A1* | 5/2016 | Huh | ............... | B60L 7/26 701/70 |
| 2016/0200324 A1* | 7/2016 | Suzuki | ............... | B60W 10/08 701/22 |
| 2016/0221468 A1* | 8/2016 | Suzuki | ............... | B60L 3/106 |
| 2017/0021731 A1* | 1/2017 | Suzuki | ............... | B60T 8/1755 |
| 2018/0072305 A1* | 3/2018 | Choi | ............... | B60K 6/485 |
| 2018/0154777 A1* | 6/2018 | Hall | ............... | B60L 7/26 |
| 2018/0251116 A1* | 9/2018 | Cho | ............... | B60W 20/14 |

FOREIGN PATENT DOCUMENTS

| | | | | |
|---|---|---|---|---|
| JP | 2008260428 A | * | 10/2008 | ............. B60L 15/20 |
| KR | 20160135577 A | * | 11/2016 | |

* cited by examiner

HYBRID ELECTRIC VEHICLE AND BRAKING CONTROL METHOD THEREOF

CROSS REFERENCE TO RELATED APPLICATION(S)

This application claims the benefit of Korean Patent Application No. 10-2019-0034836 filed on Mar. 27, 2019, which is hereby incorporated by reference as if fully set forth herein.

BACKGROUND

Field of the Invention

The present invention relates to a hybrid electric vehicle capable of achieving regenerative braking with enhanced responsiveness and efficiency, and a braking control method thereof.

Discussion of the Related Art

In general, a hybrid electric vehicle (HEV) refers to a vehicle that uses two types of power sources. Particularly, the two types of power sources are mainly an engine and an electric motor. Such a hybrid electric vehicle exhibits superior fuel economy and superior power performance, and is also advantageous in terms of reduction in exhaust gas, compared to vehicles including only an internal combustion engine. Accordingly, active development has recently been conducted for hybrid electric vehicles.

A hybrid electric vehicle may be driven in two travel modes based on which power train operates. One of the travel modes is an electric vehicle (EV) mode in which the vehicle is driven only using the electric motor, and the other travel mode is a hybrid electric vehicle (HEV) mode in which the electric motor operates together with an engine. The hybrid electric vehicle performs transition between the two modes based on travel conditions. Generally, such a travel mode transition is executed to maximize fuel economy or driving efficiency in accordance with efficiency characteristics of the power train.

In addition, in the hybrid electric vehicle (HEV), the motor operates as a generator, together with the existing hydraulic frictional brake, during braking, thereby converting kinetic energy of the vehicle into electrical energy, and, as such, braking is achieved. Braking performed in the above-described manner is referred to as "regenerative braking". In the hybrid electric vehicle, a maximum braking amount is used for regenerative braking during braking to achieve an enhancement in fuel economy. The maximum braking amount is determined based on maximum power of the motor and a state of charge (SOC) of a battery. When braking is performed in a general hybrid electric vehicle based on manipulation of a brake pedal by the driver, the total braking force according to the manipulation amount of the brake pedal is typically distributed into frictional braking and regenerative braking. Such distribution is shown in FIG. 1.

FIG. 1 illustrates an example of a braking force distribution form in a general hybrid electric vehicle according to the related art. In a graph shown in FIG. 1, a horizontal axis represents vehicle speed, and a vertical axis represents braking force. Referring to FIG. 1, the total braking force may be satisfied in the form of summation of a regenerative braking torque and a frictional braking torque in the motor. The regenerative braking torque does not exceed the maximum torque of the motor. Additionally, the regenerative braking torque is limited by maximum power of the motor in accordance with speed.

Hereinafter, a procedure of executing regenerative braking will be described with reference to FIG. 2. FIG. 2 shows an example of a procedure of determining a regenerative braking amount and executing regenerative braking based on results of the determination in a general hybrid electric vehicle according to the related art.

Referring to FIG. 2, an integrated brake actuation unit iBAU first determines a total braking torque that corresponds to a manipulation amount of a brake pedal when the driver manipulates or engages the brake pedal (1). The integrated brake actuation unit requests that a hybrid control unit (HCU) allocate a predetermined portion of the determined total braking torque as a regenerative braking torque (2). Accordingly, the HCU transmits a torque command to a motor control unit (MCU) based on the requested regenerative braking torque, taking into consideration a system situation (e.g., requesting a motor torque) (3).

The MCU then executes the torque command received from the HCU, measures the executed torque, and transmits the measured torque to the HCU (4). Accordingly, the HCU calculates the executed regenerative braking torque based on the torque executed in the motor, and then transmits the calculated regenerative braking torque to the integrated brake actuation unit (iBAU) (5). The iBAU applies a portion of the total braking torque, except for the regenerative braking torque, through a hydraulic brake (6).

However, communication delay may occur during execution of communication for requests (2 and 3) and execution reports (4 and 5) among the control units iBAU, HCU and MCU in the above-mentioned braking force distribution procedure. For example, when communication among the controllers use a controller area network (CAN) communication system, communication delay of at least 40 ms may occur through communication of 4 times, assuming that the period of the network is 10 ms. Such communication delay causes degradation in drivability and responsiveness in an excessive period, and also causes degradation in regenerative braking efficiency.

In particular, when the actual regeneration amount executed by the motor is not reflected in the integrated brake actuation unit iBAU due to delay, application of hydraulic braking corresponding to a given execution amount is performed. Accordingly, the regenerative braking amount is reduced due to response characteristics of hydraulic braking until an incorrect hydraulic pressure is released.

SUMMARY

Accordingly, the present invention provides a hybrid electric vehicle and a braking control method thereof that substantially obviate one or more problems due to limitations and disadvantages of the related art. An object of the present invention is to provide a hybrid electric vehicle capable of achieving more efficient regenerative braking, and a braking control method thereof. Another object of the present invention is to provide a hybrid electric vehicle capable of achieving regenerative braking enhanced in responsiveness as well as drivability, and a braking control method thereof.

Additional advantages, objects, and features of the exemplary embodiments will be set forth in part in the description which follows and in part will become apparent to those having ordinary skill in the art upon examination of the following or may be learned from practice of the exemplary embodiments. The objectives and other advantages of the exemplary embodiments may be realized and attained by the structure particularly pointed out in the written description and claims hereof as well as the appended drawings.

In accordance with one aspect of the claimed invention, a braking control method of a hybrid electric vehicle may include determining, by a first controller, a total braking amount corresponding to a manipulation amount of a brake pedal, transmitting a regenerative braking request corresponding to at least a portion of the total braking amount from the first controller to a second controller, determining, by the second controller, a state of a regenerative braking system having a motor and a battery, calculating a regenerative braking execution amount by selectively using a first torque corresponding to a torque command transmitted to a third controller to operate the motor based on the regenerative braking request or a second torque measured by the third controller based on the state determined by the second controller, and determining, by the first controller, a braking force of a frictional brake based on the calculated regenerative braking execution amount and the total braking amount.

In another aspect of the present invention, a hybrid electric vehicle may include a first controller configured to operate a motor, a second controller configured to determine a total braking amount corresponding to a manipulation amount of a brake pedal, and a third controller configured to determine a state of a regenerative braking system having a motor and a battery, in response to receiving a regenerative braking request corresponding to at least a portion of the total braking amount from the second controller, and calculating a regenerative braking execution amount by selectively using a first torque corresponding to a torque command transmitted to the first controller based on the regenerative braking request or a second torque measured by the first controller based on the determined state. The second controller may be configured to determine a braking force of a frictional brake based on the calculated regenerative braking execution amount and the total braking amount.

The hybrid electric vehicle associated with at least one of the exemplary embodiments of the present invention configured as described above may more efficiently execute regenerative braking. In particular, degradation in drivability and responsiveness caused by communication delay may be prevented through calculation of a regenerative braking execution amount executed taking a situation or state of the motor into consideration. In addition, braking linearity and stability in a failure situation may be enhanced through coherence verification of the regenerative braking execution amount.

Effects of the present disclosure are not limited to the above-described effects. Other effects not described in the present disclosure may be readily understood by those skilled in the art through the following description. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and along with the description serve to explain the principle of the invention. In the drawings.

DETAILED DESCRIPTION

Figure 1:
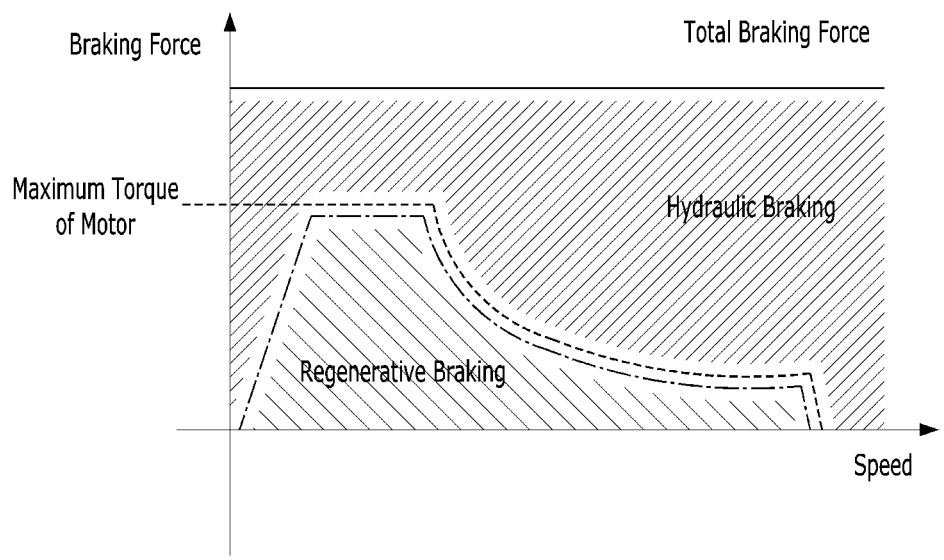
FIG. 1 is a graph illustrating an example of a braking force distribution form in a general hybrid electric vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings and, as such, may be easily implemented by one of ordinary skill in the art to which the present invention pertains. The present invention may be embodied in many different forms and should not be construed as limited to the embodiments set forth herein. Matters having no concern with the invention will be omitted for clarity of explanation. The same or similar elements are designated by the same reference numerals throughout the specification.

The terms "including", "comprising", "having" and variations thereof disclosed herein mean "including but not limited to" unless expressly specified otherwise, and, as such, should not be construed to exclude elements other than the elements disclosed herein and should be construed to further include additional elements. Elements designated by the same reference numerals throughout the specification mean the same constituent elements.

Prior to description of a hybrid electric vehicle according to an exemplary embodiment of the present invention and a braking control method for the same, a structure and a control system in a hybrid electric vehicle, to which exemplary embodiments of the present invention are applicable, will be described.

Figure 3:
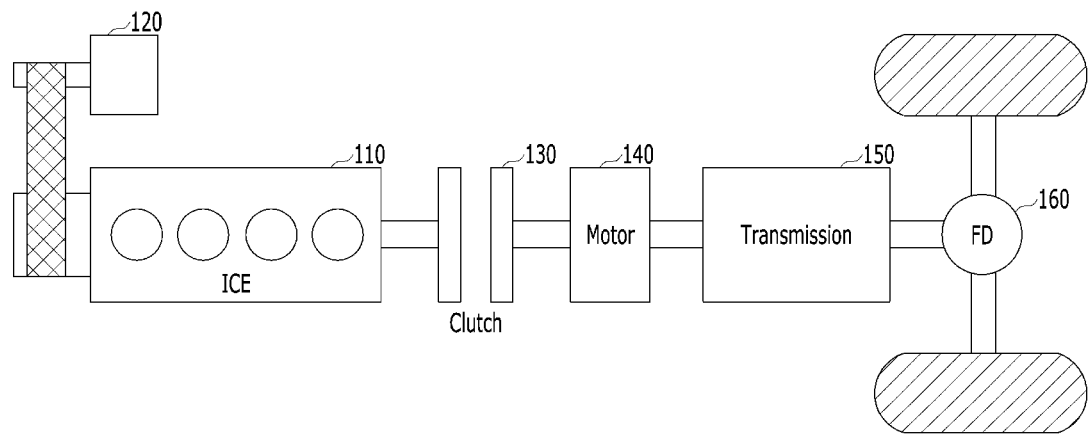
FIG. 3 is a diagram illustrating an example of a power train structure of a parallel hybrid electric vehicle to which exemplary embodiments of the present invention are applicable.

FIG. 3 illustrates an example of a power train structure of a parallel hybrid electric vehicle to which exemplary embodiments of the present invention are applicable. Referring to FIG. 3, a power train of a hybrid electric vehicle is illustrated. The illustrated power train employs a parallel type hybrid system in which a drive motor 140 and an engine clutch 130 are mounted between an internal combustion engine (ICE) 110 and a transmission 150.

Generally, in such a vehicle, when the driver engages an accelerator pedal after an engine starts, the motor 140 is first driven using electric power from a battery in an opened state of the engine clutch 130. Power from the motor 140 is transmitted to wheels via the transmission 150 and a final drive (FD) 160 and, accordingly, the wheels are driven (e.g., an electric vehicle (EV) mode). When higher driving force is required as the vehicle is gradually accelerated, a starter generator motor 120 may operate to drive the engine 110.

When rotation speeds of the engine 110 and the motor 140 become equal in accordance with the above-described operation, the engine clutch 130 may be engaged and the engine 110 may be configured to drive the vehicle together with the motor 140, or drive the vehicle alone (e.g., transition from the EV mode to a hybrid electric vehicle (HEV) mode). When a predetermined engine-off condition is satisfied in accordance with, for example, speed reduction of the vehicle or the like, the engine clutch 130 may be opened and the engine 110 may be stopped (e.g., transition from the HEV mode to the EV mode). In addition, in the hybrid electric vehicle, driving force of the wheels may be converted into electrical energy during braking and may recharge the battery. This operation is referred to as "braking energy recovery" or "regenerative braking".

The starter generator motor 120 may operate as a starter motor when engine start is executed, and operate as a generator after the engine starts or when rotational energy of the engine is recovered in an engine-off state. In this regard, the starter generator motor 120 may be referred to as a "hybrid starter generator (HSG)". In some cases, the starter generator motor 120 may be referred to as an "auxiliary motor".

Figure 4:
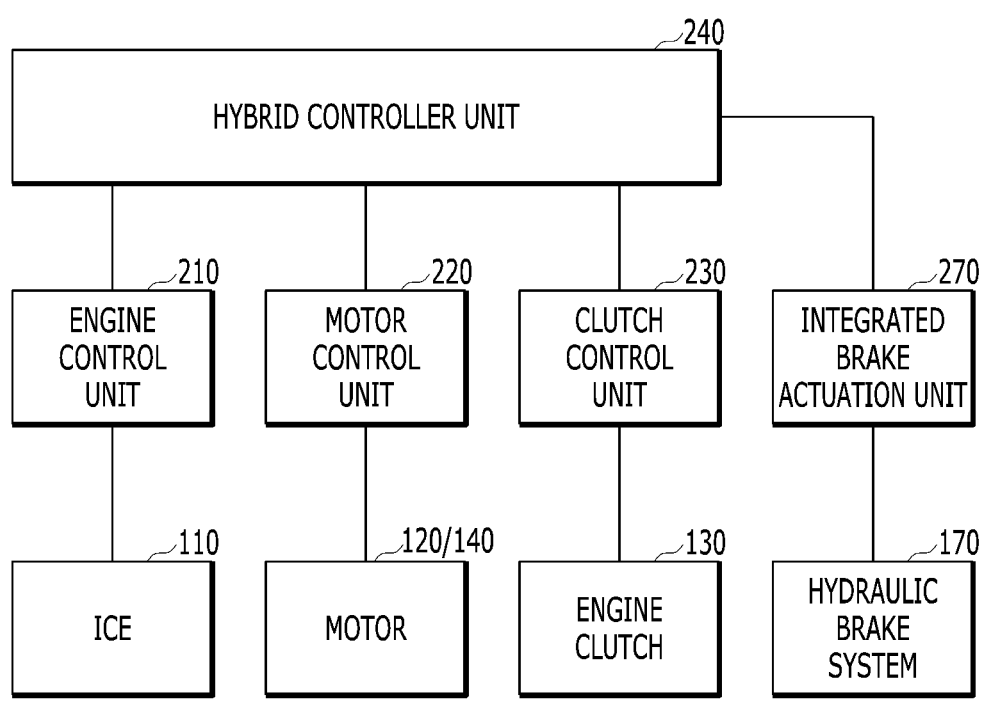
FIG. 4 is a block diagram illustrating an example of a control system in a hybrid electric vehicle to which exemplary embodiments of the present invention are applicable.

Co-relation between controllers within a vehicle to which the above-described power train is applied is illustrated in FIG. 4. FIG. 4 is a block diagram illustrating an example of a control system in a hybrid electric vehicle to which exemplary embodiments of the present invention are applicable.

Referring to FIG. 4, in the hybrid electric vehicle to which exemplary embodiments of the present invention are applicable, the internal combustion engine 110 may be operated by an engine control unit 210 (ECU), and torque of the starter generator motor 120 and the drive motor 140 may be adjusted and operated by a motor control unit (MCU) 220. In addition, the engine clutch 130 may be operated by a clutch control unit 230. In particular, the engine control unit 210 may also be referred to as an "engine management system (EMS)". In addition, the hydraulic brake system 170 may be operated by an integrated brake actuation unit 270.

The control units as described above may be connected to a hybrid control unit (HCU) 240 or controller to execute overall mode transition, which is an upper-level controller, and, as such, may be configured to supply information required for change of a driving mode, information required for engine clutch operation upon gear shifting and/or information required for engine stop under operation of the hybrid controller 240 or may execute operation in accordance with control signals received from the hybrid controller 240.

In particular, the hybrid controller 240 may be configured to determine whether to execute mode transition based on a driving state of the vehicle. For example, the hybrid controller 240 may be configured to determine a time when the engine clutch 130 is opened. When the engine clutch 130 is opened, the hybrid controller 240 may be configured to execute hydraulic pressure control (in the case of a wet type engine clutch (EC)) or torque capacity control (in the case of a dry type EC). In addition, the hybrid controller 240 may be configured to determine a state of the engine clutch 130 (e.g., lock-up, slip, open, etc.) and adjust a time when fuel injection into the engine 110 is stopped.

Furthermore, the hybrid controller 240 may be configured to transmit, to the motor controller 220 (MCU), a torque command for adjusting a torque of the starter generator motor 120 for engine stop, thereby controlling recovery of engine rotation energy. In addition, the hybrid controller 240 may be configured to determine mode transition conditions and may operate the lower-level controllers for mode transition upon control of driving mode transition. In particular, the hybrid controller 240 may be configured to perform an efficient regenerative braking procedure through cooperative control with the integrated brake actuation unit 270 according to the illustrated exemplary embodiment.

It will be appreciated by those skilled in the art that connection relations among the above-described controllers and functions/definitions of respective controllers are illustrative and, as such, the controllers are not limited by names thereof. For example, the function of the hybrid controller 240 may be realized by any one of the remaining controllers or may be provided by two or more of the remaining controllers in a distributed manner.

Additionally, it will be appreciated by those skilled in the art that the above-described configuration of FIGS. 3 and 4 is an exemplary configuration of a hybrid electric vehicle, and hybrid electric vehicles applicable to exemplary embodiments of the present invention are not limited to the above described configuration. Hereinafter, a configuration of the hybrid controller for executing braking control according to an exemplary embodiment of the present invention and co-operation thereof with other control units will be described with reference to FIGS. 5 and 6.

Figure 5:
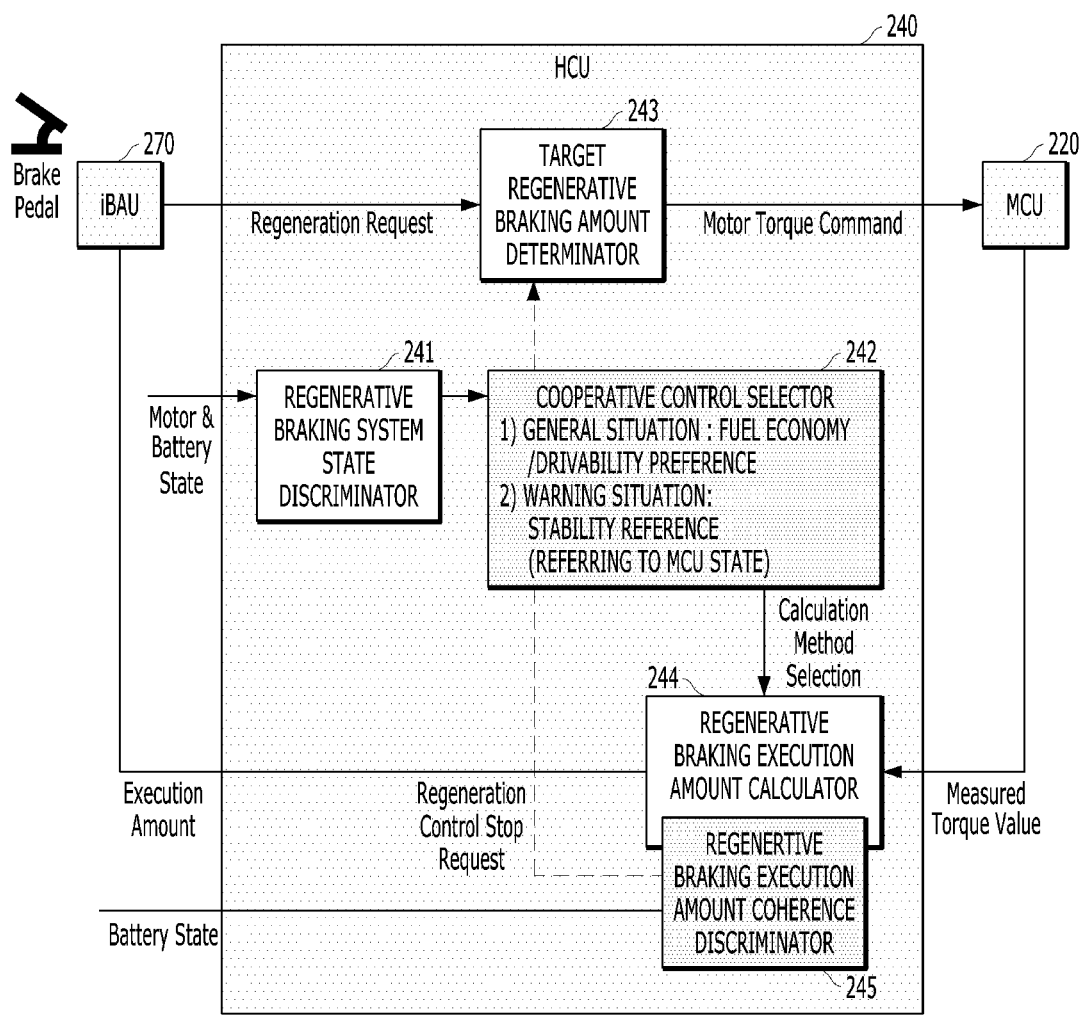
FIG. 5 is a block diagram illustrating an example of a configuration of a hybrid electric vehicle control system for executing braking control according to an exemplary embodiment of the present invention.

FIG. 5 illustrates an example of a configuration of a hybrid electric vehicle control system for executing braking control according to an exemplary embodiment of the present invention. Referring to FIG. 5, the integrated brake actuation unit 270 (e.g., integrated brake actuator), the hybrid controller 240 and the motor controller 220 may contribute to braking control according to the exemplary embodiment of the present invention.

In addition, for execution of braking control according to the exemplary embodiment of the present invention, the hybrid controller 240 may include a regenerative braking system state detector 241, a cooperative control selector 242, a target regenerative braking amount determinator 243, a regenerative braking execution amount calculator 244, and a regenerative braking execution amount coherence discriminator 245. Hereinafter, the constituent elements of the hybrid controller 240 will be described in detail.

First, the regenerative braking system state detector 241 may be configured to monitor states of elements of the regenerative braking system having influence on the performance of the regenerative braking system, for example, the motor 140, the battery (not shown), etc. For example, the regenerative braking system state detector 241 may be configured to monitor at least one of a motor temperature, a motor voltage, or a state of charge (SOC) in the battery. The monitoring may always be executed in real time, or may be executed at intervals of a predetermined time, without being limited thereto.

When a regenerative braking request according to manipulation of the brake pedal by the driver is generated from the integrated brake actuation unit 270, the target regenerative braking amount determinator 243 may be configured to determine a regenerative braking torque of the motor based on a target regenerative braking amount, and transmit, to the motor control unit 220, a torque command (hereinafter, referred to as "Tq Cmd") that corresponds to the determined regenerative braking torque.

The cooperative control selector 242 may be configured to determine whether the torque command Tq Cmd determined by the target regenerative braking amount determinator 243 may be completely executed, based on the state of the regenerative braking system determined by the regenerative braking system state detector 241. In accordance with results of the discrimination, the cooperative control selector 242 may be configured to provide a notification to the regenerative braking execution amount calculator 244 regarding whether the current situation is a general situation or a warning situation.

For example, the cooperative control selector 242 may be configured to determine the situation of the regenerative braking system by comparing at least one of the temperature, voltage, allowable electric power, or residual energy capacity of a component associated with electric power, for example, a motor, an inverter, a battery, or the like with a critical value thereof. Particularly, the general situation refers to a situation in which the regenerative braking system is in a state capable of completely executing the torque command Tq Cmd. The warning situation refers to a situation in which the regenerative braking system is in a state incapable of completely executing the torque command Tq Cmd or has a possibility that the torque command Tq Cmd is unable to be completely executed. The warning situation will be described later in more detail with reference to FIG. 7.

Figure 2:
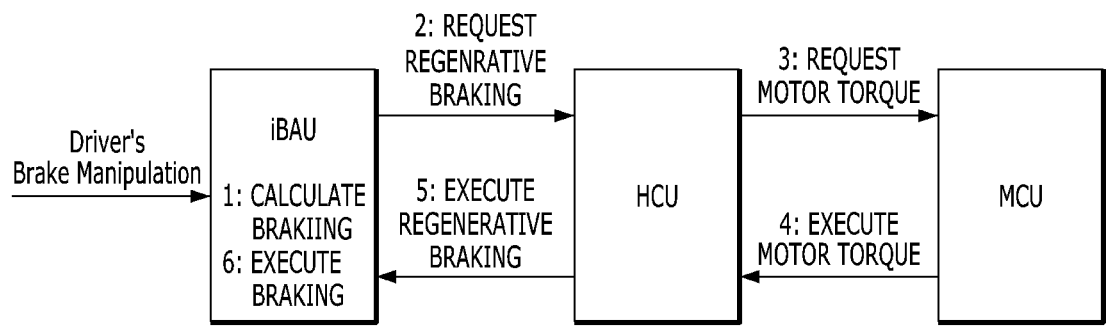
FIG. 2 is a diagram illustrating an example of a procedure of determining and executing a regenerative braking amount in a general hybrid electric vehicle according to the related art.

The regenerative braking execution amount calculator 244 may be configured to directly calculate a regenerative braking execution amount based on the torque command Tq Cmd based on situation information from the cooperative control selector 242. In particular, calculation of the regenerative braking execution amount may be directly executed without waiting for reception of results of the motor torque execution (4) after the motor torque request (3) as described above with reference to FIG. 2 (e.g., communication between the hybrid control unit and the motor control unit being neglected) and, as such, delay corresponding to at least two periods of the associate network may be reduced.

Furthermore, when the cooperative control selector 242 outputs a notification regarding a warning situation, the regenerative braking execution amount calculator 244 may be configured to acquire a motor torque measured by the motor control unit 220 (hereinafter, referred to as "Est Tq" or a "measured torque value") after waiting for reception of results of the motor torque execution (4) as described above with reference to FIG. 2, and then may be configured to calculate the regenerative braking execution amount based on the acquired motor torque. In other words, the regenerative braking execution amount calculator 244 may be configured to calculate a regenerative braking execution amount through, for example, "fn(Tq Cmd)", in a general situation, whereas the regenerative braking execution amount calculator 244 may be configured to calculate a regenerative braking execution amount through, for example, "fn(Est Tq)", in a warning situation.

In particular, "fn( )" refers to a function for exchanging a torque of the motor with an equivalent torque of a wheel position where a frictional brake is mounted, taking into consideration gear ratio, transmission efficiency, etc. It will be appreciated by those skilled in the art that the present invention is not limited by a concrete form or factors of the above-described function, and this function may be appropriately derived to be suitable for a vehicle configuration. Meanwhile, the calculated execution amount may be transmitted to the integrated brake actuation unit 270. Accordingly, the integrated brake actuation unit 270 may be configured to perform control to enable the frictional braking system 170 to execute a braking amount obtained by deducting the transmitted execution amount from a total required braking torque.

The regenerative braking execution amount coherence detector 245 may be a lower-level element of the regenerative braking execution amount calculator 244. The regenerative braking execution amount coherence detector 245 may be configured to determine whether the actually executed torque is greater than the torque command Tq Cmd by a predetermined value or more due to a condition that the regenerative braking system is unable to sense the regenerative braking execution amount calculated by the regenerative braking execution amount calculator 244 based on the current situation.

As a concrete discrimination method, comparison of motor power derived through the relation between torque and revolutions per minute (RPM) in the motor with recharged power of the battery and a variation in speed reduction of the vehicle may be utilized. For example, a method of comparing a product of battery current by battery voltage with a value obtained by calculating "motor speed×motor regenerative torque×efficiency+auxiliary load use amount" may be used. In particular, the auxiliary load use amount may be derived based on an operation amount of a direct current (DC) converter, for example, a low DC-DC converter (LDC). In another example, a method of comparing a value obtained by calculating "((motor regenerative torque×gear ratio+driving system loss+hydraulic braking torque)/wheel radius+travel resistance)/mass" with a vehicle acceleration may be used, but the present invention is not limited thereto.

When the regenerative braking execution amount coherence detector 245 senses an abnormal situation, for example, a condition that the actually executed torque is greater than the torque command Tq Cmd by the predetermined value or more, the regenerative braking execution amount coherence detector 245 may be configured to request that target regenerative braking amount determinator 243 reduce the target regenerative braking amount (or stop regenerative braking control) to secure braking stability. In addition, a braking execution amount according to the actual torque execution may be reported to the integrated brake actuation unit 270 and, as such, the integrated brake actuation unit 270 may be configured to execute hydraulic pressure correction. Accordingly, even when the motor outputs an abnormal torque, braking linearity and stability may be secured.

Figure 6:
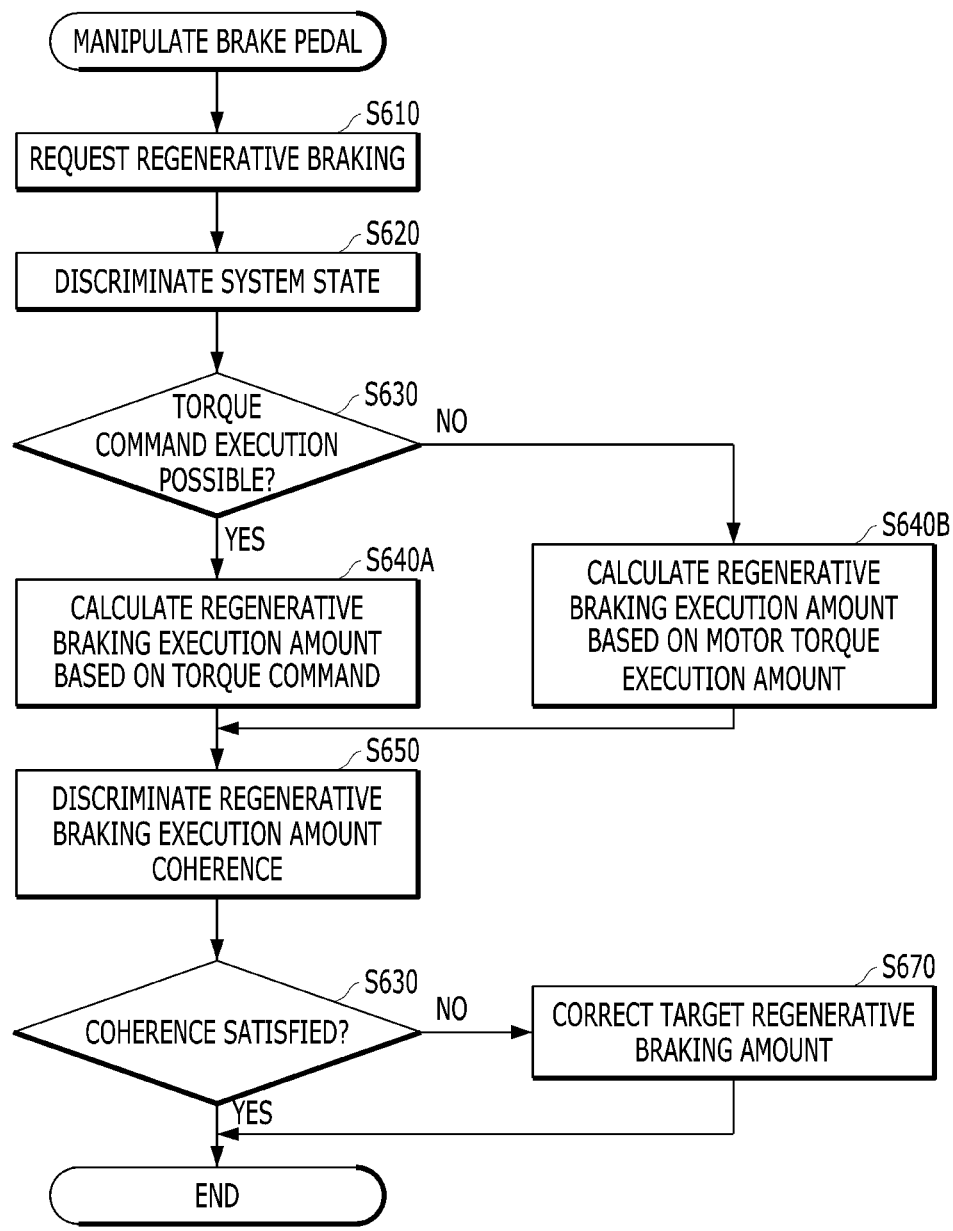
FIG. 6 is a flowchart illustrating an example of a braking control procedure in the hybrid electric vehicle according to an exemplary embodiment of the present invention.

Hereinafter, operations of respective constituent elements of the above-described hybrid controller unit 240 will be described through a flowchart with reference to FIG. 6. FIG. 6 is a flowchart illustrating an example of a braking control procedure in the hybrid electric vehicle according to an exemplary embodiment of the present invention.

Referring to FIG. 6, a regenerative braking request may be transmitted from the integrated brake actuation unit 270 to the hybrid controller unit 240 based on brake manipulation or engagement of the driver (S610). Accordingly, the cooperative control selector 242 may be configured to determine whether a torque command Tq Cmd determined by the target regenerative braking amount determinator 243 may be completely executed, based on the state of the regenerative braking system determined by the regenerative braking system state detector 241 (S620).

Based on the determination results indicating that the current situation is a general situation in which complete execution of the torque command is possible ("Yes" in S630), the regenerative braking execution amount calculator 244 may be configured to directly calculate a regenerative braking execution amount based on the torque command Tq Cmd (S640A). This operation may be directly executed without waiting for reception of a measured torque value according to execution of the torque command from the motor control unit 220.

On the other hand, based on the determination results indicating that complete execution of the torque command is impossible or there is a possibility that the torque command is unable to be completely executed ("No" in S630), the regenerative braking execution amount calculator 244 may be configured to calculate a regenerative braking execution amount based on the measured torque value according to execution of the torque command, after waiting for reception of the measured torque value from the motor control unit 220 (S640B).

Thereafter, the regenerative braking execution amount coherence detector 245 may be configured to determine coherence based on whether the actually executed torque is greater than the torque command Tq Cmd by a predetermined value or more due to a condition that the regenerative braking system is unable to sense the regenerative braking execution amount calculated by the regenerative braking execution amount calculator 244 based on the current situation (S650). A concrete discrimination method is the same as described above with reference to FIG. 6 and, as such, no repeated description will be given.

When the regenerative braking execution amount coherence detector 245 senses an abnormal situation, for example, a condition that the actually executed torque is greater than the torque command Tq Cmd by the predetermined value or more ("No" in S660), the regenerative braking execution amount coherence detector 245 may be configured to request that the target regenerative braking amount determinator 243 correct the target regenerative braking amount (or stop regenerative braking control) to secure braking stability (S670).

Through the above-described method, in place of unconditional execution of frictional braking in an initial stage of braking, the hybrid controller may first report a regenerative braking execution amount to the integrated brake actuation unit without delay of communication with the motor control unit. Accordingly, it may be possible to achieve an enhancement in efficiency while minimizing execution of unnecessary frictional braking. In addition, stability may also be secured in accordance with discrimination as to coherence of a regenerative braking execution amount and dual methods for calculating a regenerative braking execution amount according to whether a torque command may be executed.

Figure 7:
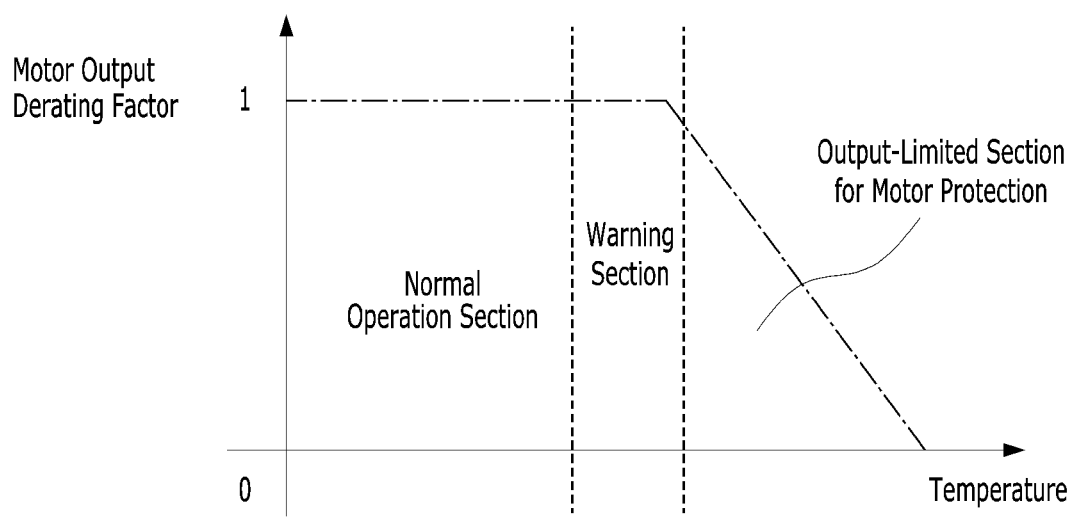
FIG. 7 is a view illustrating a warning situation according to an exemplary embodiment of the present invention.

FIG. 7 is a view illustrating a warning situation according to an embodiment of the present invention. In a graph illustrated in FIG. 7, a horizontal axis represents a temperature of the motor 140, and a vertical axis represents a motor output derating factor. The motor output derating factor is a factor multiplied by a motor output, to determine a final motor output. In a normal temperature range, the motor output derating factor is 1, and may be gradually reduced based on an increase in temperature. A section in which the motor temperature is within a predetermined range may be defined as a normal operation section.

A section continued until the motor temperature increases to a temperature, at which the motor output derating factor is less than 1, after exceeding the normal temperature range, may be defined as a warning section. The warning section is a section in which, although immediate entrance of derating control to limit an output for motor protection is not required, there is a high possibility of entrance of derating control when motor operation such as regenerative braking is continued. The warning section may be considered a section in which there is a possibility that the torque command Tq Cmd is unable to be completely executed.

In a section in which the motor temperature is greater than that of the warning section, entrance of derating control may be performed. Accordingly, this section may be considered the warning section in which the torque command Tq Cmd is unable to be completely executed. It will be appreciated by those skilled in the art that the temperature range of the warning section as described above may be variously set for different vehicles in accordance with motor specifications and cooling performance.

Meanwhile, the present invention may be embodied as code, which may be written on a program-stored recording medium that may be read by a computer. The recording medium that may be read by a computer includes all types of recording media on which data that may be read by a computer system is written. Examples of recording media that may be read by a computer may be a hard disk drive (HDD), a solid state drive (SSD), a silicon disk drive (SDD), a read only memory (ROM), a random access memory (RAM), a CD-ROM, a magnetic tape, a floppy disk, an optical data storage, and the like.

Therefore, the above detailed description should be understood as exemplary rather than limiting in all aspects. The scope of the present invention should also be interpreted by the claims below. All modifications as would be derived from the equivalent concept intended to be included within the scope of the present invention should also be interpreted as falling within the scope of the invention.

What is claimed is:

1. A braking control method of a hybrid electric vehicle, comprising:

determining, by an integrated brake actuator, a total braking amount corresponding to a manipulation amount of a brake pedal;

transmitting, by the integrated brake actuator, a regenerative braking request corresponding to at least a portion of the total braking amount to a hybrid controller;

determining, by the hybrid controller, a state of a regenerative braking system having a motor and a battery;

calculating, by the hybrid controller, a regenerative braking execution amount by selectively using each of a first torque corresponding to a torque command transmitted to a motor controller to operate the motor based on the regenerative braking request or a second torque measured by the motor controller based on the state determined by the hybrid controller; and determining, by the integrated brake actuator, a braking force of a frictional brake based on the calculated regenerative braking execution amount and the total braking amount, wherein the motor is operable in (i) a normal operation section in which a temperature is within a predetermined range and a motor output is obtained using a motor output derating factor of a predetermined value, (ii) a warning section in which the temperature is outside the predetermined range and limiting the motor output is not required, and (iii) a section in which in which the temperature is greater than that of the warning section and the motor output is obtained using a motor output derating factor of less than the predetermined value.

2. The braking control method according to claim 1, wherein the determining of the state of the regenerative braking system includes utilizing at least one selected from the group consisting of: the temperature, a voltage, an electric power, and a residual energy capacity of the regenerative braking system.

3. The braking control method according to claim 1, wherein the determining of the state of the regenerative braking system includes determining the state of the regenerative braking system to be a first situation in which the torque command is executed or a second situation in which the torque command is not executed.

4. The braking control method according to claim 3, wherein:
the calculating of the regenerative braking execution amount is executed based on the first torque when the state of the regenerative braking system is determined to be the first situation; and
the calculating of the regenerative braking execution amount is executed based on the second torque when the state of the regenerative braking system is determined to be the second situation.

5. The braking control method according to claim 4, wherein the calculating of the regenerative braking execution amount is executed to directly calculate the regenerative braking execution amount based on the first torque without waiting for reception of the second torque from the motor controller, when the state of the regenerative braking system is determined to be the first situation.

6. The braking control method according to claim 1, further comprising:
determining coherence of the calculated regenerative braking execution amount.

7. The braking control method according to claim 6, wherein determining the coherence includes comparing a measured torque and a speed of the motor with a current value and a voltage value of the battery to determine whether the regenerative braking system is abnormal.

8. The braking control method according to claim 7, further comprising:
reducing or deleting a regenerative braking request amount transmitted to the motor controller when abnormality of the regenerative braking system is detected.

9. A hybrid electric vehicle, comprising:
a motor controller configured to operate a motor;
an integrated brake actuator configured to determine a total braking amount corresponding to a manipulation amount of a brake pedal; and
a hybrid controller configured to determine a state of a regenerative braking system having a motor and a battery, in response to receiving a regenerative braking request corresponding to at least a portion of the total braking amount from the integrated brake actuator, and calculate a regenerative braking execution amount by selectively using each of a first torque corresponding to a torque command transmitted to the motor controller based on the regenerative braking request or a second torque measured by the motor controller based on the determined state,
wherein the integrated brake actuator is configured to determine a braking force of a frictional brake based on the calculated regenerative braking execution amount and the total braking amount, and
wherein the motor is operable in (i) a normal operation section in which a temperature is within a predetermined range and a motor output is obtained using a motor output derating factor of a predetermined value, (ii) a warning section in which the temperature is outside the predetermined range and limiting the motor output is not required, and (iii) a section in which in which the temperature is greater than that of the warning section and the motor output is obtained using a motor output derating factor of less than the predetermined value.

10. The hybrid electric vehicle according to claim 9, wherein the hybrid controller is configured to determine the state of the regenerative braking system by utilizing at least one selected from the group consisting of: the temperature, a voltage, an electric power, and a residual energy capacity of the regenerative braking system.

11. The hybrid electric vehicle according to claim 9, where the hybrid controller is configured to determine the state of the regenerative braking system to be a first situation in which the torque command is executed or a second situation in which the torque command is not executed.

12. The hybrid electric vehicle according to claim 11, wherein:
the hybrid controller is configured to calculate the regenerative braking execution amount based on the first torque when the state of the regenerative braking system is determined to be the first situation; and
the hybrid controller is configured to calculate the regenerative braking execution amount based on the second torque when the state of the regenerative braking system is determined to be the second situation.

13. The hybrid electric vehicle according to claim 12, wherein the hybrid controller is configured to directly calculate the regenerative braking execution amount based on the first torque without waiting for reception of the second torque from the motor controller, when the state of the regenerative braking system is discriminated to be the first situation.

14. The hybrid electric vehicle according to claim 9, wherein the hybrid controller is configured to determine coherence of the calculated regenerative braking execution amount.

15. The hybrid electric vehicle according to claim 14, wherein the hybrid controller is configured to compare a measured torque and a speed of the motor with a current value and a voltage value of the battery to determine whether the regenerative braking system is abnormal.

16. The hybrid electric vehicle according to claim 15, wherein the hybrid controller is configured to reduce or delete a regenerative braking request amount transmitted to the motor controller when abnormality of the regenerative braking system is detected.

\* \* \* \* \*